UNITED STATES PATENT OFFICE.

ISIDOR KITSEE, OF PHILADELPHIA, PENNSYLVANIA.

FILTER.

1,162,244.     Specification of Letters Patent.     Patented Nov. 30, 1915.

No Drawing.     Application filed April 24, 1914. Serial No. 834,269.

*To all whom it may concern:*

Be it known that I, ISIDOR KITSEE, a citizen of the United States, residing at Philadelphia, in the county of Philadelphia and State of Pennsylvania, have invented certain new and useful Improvements in Filters, of which the following is a specification.

My invention relates to an improvement in filters.

Its object is to produce a filter in an economical and efficient manner.

My invention is applicable to filters wherein the filtering material is of vegetable origin as well as to filters wherein the filtering material is of animal origin and relates to the class of filters in which a charred body, such as charcoal, comprises the filtering medium.

I have found that if a material capable of being charred is in its original but comminuted state cemented together with the aid of a substance capable of withstanding a high temperature, a very efficient filter is produced through the charring of these comminuted particles.

Example 1: The filtering material to be of vegetable origin. In this case, I have used with good results common saw-dust, such as comes from lumber mills, and I have used as a cementing substance, a mixture of phenol and formaldehyde. This mixture I have used in different forms and one of these forms was the cement known in commerce as Bakelite. This cement has the property of withstanding a very high temperature higher than is required for converting the saw-dust into charcoal. I produced a homogeneous mass out of saw-dust and cement by using about the following proportions:—ten parts of saw-dust intimately mixed with one part of cement in its fluid state. The mass produced was then subjected to a slight pressure so as to compact the same sufficiently and form a solid mechanical unit. In some of these experiments, a plate of a thickness of one inch was produced and then inclosed in an air-tight iron receptacle. This receptacle was heated. After a series of experiments, in which the time and degree of heat were varied, it was found that the saw-dust had sufficiently charred, so as to produce the required charcoal.

Example 2: Charred blood, such as is used in sugar refinery, was cemented together with the aid of one of the cements used in Example 1, and after being pressed, was subjected to a treatment of high temperature in a closed vessel. The resultant block was tested and found to be efficient. It has to be stated that the cement used in the production of the filters must be of a nature so as to withstand, as said above, a very high temperature without undergoing a conversion to integrate and it must also be of a nature so as not to lose its cementing power through this high temperature. I have found that a mixture of phenol and formaldehyde is well adapted for the purpose.

I have given above an example with saw-dust and blood, but it is obvious that other suitable materials may be substituted. It is also obvious that instead of charred blood, blood in its natural state, or uncharred blood in its solid state, may be substituted therefor.

A filter constructed with this, my invention, can easily be renovated. The filter to be renovated may first be washed and should then be placed in a closed receptacle and subjected to the necessary high temperature.

Having now described my invention, what I claim as new and desire to secure by Letters Patent is:—

1. The method of producing a filter, which consists in molding together a series of comminuted particles of a material adapted to be charred intermixed with a cement adapted to withstand the charring process and then subjecting the cemented mass to a high temperature in a confined space said cement comprising a phenol and a formaldehyde.

2. The method of producing a filter, which consists in producing one mechanical unit out of a series of comminuted particles of a material adapted to be charred with the aid of a cement comprising a phenol and a formaldehyde, molding the same into desired shape and then subjecting it in a closed vessel to a high temperature whereby the comminuted particles are charred.

3. As a new article of manufacture, carbonized comminuted particles cemented together with the aid of a cement comprising a phenol and a formaldehyde.

In testimony whereof I affix my signature in presence of two witnesses.

ISIDOR KITSEE.

Witnesses:
MARY C. SMITH,
EDITH R. STILLEY.